United States Patent
Hendrix

(10) Patent No.: US 9,429,433 B2
(45) Date of Patent: Aug. 30, 2016

(54) ROUTE GUIDANCE AND IDENTIFICATION SYSTEM

(71) Applicant: Jennifer Hendrix, Waxahachie, TX (US)

(72) Inventor: Jennifer Hendrix, Waxahachie, TX (US)

( * ) Notice: Subject to any disclaimer, the term of this patent is extended or adjusted under 35 U.S.C. 154(b) by 0 days.

(21) Appl. No.: 14/703,148

(22) Filed: May 4, 2015

(65) Prior Publication Data

US 2016/0131486 A1 May 12, 2016

Related U.S. Application Data

(60) Provisional application No. 62/076,942, filed on Nov. 7, 2014.

(51) Int. Cl.
*G01C 21/20* (2006.01)
*G01S 5/00* (2006.01)
*H04W 64/00* (2009.01)

(52) U.S. Cl.
CPC ............... *G01C 21/206* (2013.01); *G01S 5/00* (2013.01); *H04W 64/00* (2013.01)

(58) Field of Classification Search
CPC .... G01C 21/206; G01C 17/28; G01C 17/38; G01C 21/08; G01C 21/20; G01C 21/26; G01C 21/367; G01C 21/30
USPC ................................. 701/400, 409, 445, 525
See application file for complete search history.

(56) References Cited

U.S. PATENT DOCUMENTS

| | | | | |
|---|---|---|---|---|
| 3,967,277 A * | 6/1976 | Hastings | ................... | G01S 5/12 342/394 |
| 6,029,069 A * | 2/2000 | Takaki | ............... | G01C 21/3608 455/456.1 |
| 6,807,478 B2 * | 10/2004 | Giannopoulos | ........ | G01C 21/00 701/434 |
| 7,584,048 B2 * | 9/2009 | Pham | ..................... | G01C 21/20 701/434 |
| 8,538,687 B2 * | 9/2013 | Plocher | .................. | G01C 21/20 701/433 |
| 9,116,003 B2 * | 8/2015 | Khorashadi | ............ | G01C 21/20 |
| 2006/0293839 A1 * | 12/2006 | Stankiewicz | ........ | G01C 21/206 701/434 |
| 2010/0070173 A1 * | 3/2010 | Sakamoto | ............... | G01C 21/20 701/533 |
| 2012/0143495 A1 * | 6/2012 | Dantu | .................. | G01C 21/206 701/428 |
| 2012/0166077 A1 * | 6/2012 | Herzog | ............. | G01C 21/3652 701/425 |
| 2013/0325327 A1 * | 12/2013 | Yamaoka | ............. | G01C 21/206 701/445 |
| 2014/0087707 A1 * | 3/2014 | Gustafsson | ....... | H04W 52/0254 455/418 |
| 2015/0369623 A1 * | 12/2015 | Blumenberg | ........ | G01C 21/367 701/532 |

* cited by examiner

*Primary Examiner* — Shardul Patel
(74) *Attorney, Agent, or Firm* — Law Office of Jeff Williams; J. Oliver Williams

(57) ABSTRACT

The present application discloses a personal navigation system for providing route guidance and description information to visually impaired users. The system includes a terminal located near an entrance of an area to be traversed. The terminal stores data related to the physical layout of the area. A plurality of location transmitters are distributed about the area and broadcast a signal. A portable electronic device is configured to receive data from the terminal upon entry and determine the location of the user by processing the broadcasted signal of the transmitters. Route guidance is provided to the user via audible or sensory methods. Information may also be provided to the user describing the surrounding area.

13 Claims, 3 Drawing Sheets

ROUTE GUIDANCE AND IDENTIFICATION SYSTEM

BACKGROUND

1. Field of the Invention

The present application relates generally to an electronic system, and in particular to a system for instructing a user how to navigate within buildings.

2. Description of Related Art

More than 7 million people go blind each year in the United States. Blindness can arise from one of many different causes, such as macular degeneration, accident or injury, diabetes, and so on. Blindness works to severely limit one's ability to be mobile. This lack of mobility inherently results often in the seclusion, depression, and inability of those individuals from engaging in the public environment.

Various methods or devices have been developed to assist blind individuals in navigating and engaging in the public environment. For example, seeing-eye dogs are used to help direct an individual. Although dogs help in terms of general navigation, the dog is unable to provide accurate and detailed navigation to the blind. Additional disadvantages to the use of trained dogs to solve navigation issues is that the training of dogs can be very time consuming and costly. Additionally, distractions may arise which may get in the way of the dog performing despite training.

Another method or device is the elongated stick. The blind individual is tasked with repetitively passing the stick in a sideways motion in front of them to alert them to any obstacles. This stick only provides immediate obstacle detection but provides no additional benefit.

Although great strides have been made in the area of mobility aids for the visually impaired, considerable shortcomings remain. A need for the blind is the ability to successfully and accurately navigate the channels of the known world. It is a desire for them to identify a location to go to and successfully reach that destination. Route guidance seen in maps are only used for the general locations on a map but fail to pinpoint precise locations within structures or complexes. Locations off the roads and exterior walkways are typically unnavigable through route guidance. For example, doors, bathrooms, office suites, stairs, and emergency exits are often if not always unknown to those who are blind. Present systems and tools for the blind are unable to provide the freedom and flexibility to navigate.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
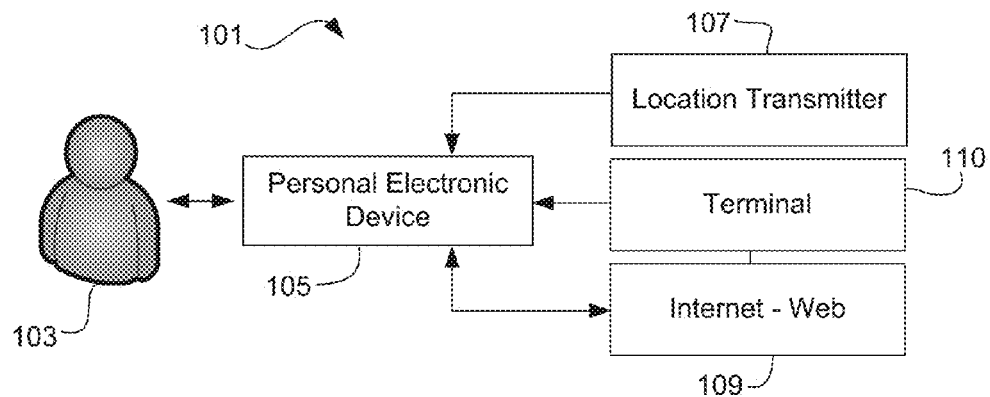
FIG. 1 is a schematic of a navigation system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method of use in accordance with the present application overcomes one or more of the above-discussed problems commonly associated with seeing aides for the visually impaired. Specifically, the system of the present application is configured to provide a user with: (1) route guidance to a particular destination; and (2) description information about the surroundings. In particular, the system is directed to providing route guidance and information within a structure or complex via either audible or sensory methods. These and other unique features of the system are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application includes a portable electronic device carried by a visually impaired individual ("user") that is configured to calculate the position of the user and provide route guidance to the user for a selected destination. The route guidance is focused on routes within areas and structures outside the purview of typical GPS maps. The system includes a terminal located at entrance points to a particular area to be traversed. The terminal includes detailed layout data for the area and transmits that data to the portable electronic device upon entrance. The portable electronic device calculates the position of the user by receiving location data from one or more location transmitters selectively located throughout the area. Once the user selects the destination, the portable electronic device determines an acceptable route based upon the layout data received and communicates the route to the user. The position of the user in the area is monitored by the portable electronic device. Locations of interest within the area may be communicated to the user, such as details concerning the location of doors, windows, restrooms, exits, and descriptive messages (i.e. "authorized personnel only") are possible. The system is configured to work with other aides to assist the user in navigating in public (i.e. stick to locate objects as the user moves within halls).

Figure 2:
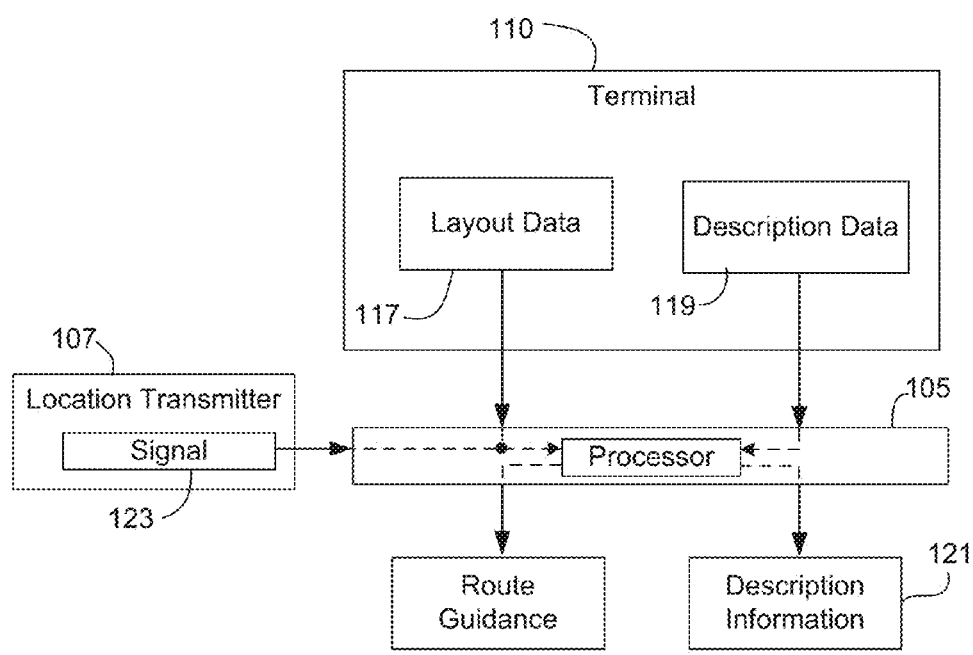
FIG. 2 is a detailed flow chart of the navigation system of FIG. 1.

Referring now to the Figures wherein like reference characters identify corresponding or similar elements in form and function throughout the several views. FIGS. 1 and 2 in the drawings illustrate a navigation system 101 for use by the visually impaired 103 ("user"). System 101 includes a portable electronic device 105 in communication with one or more location transmitters 107 and a terminal 110. Data shared within system 101 permits device 105 to calculate the position of the user within a particular area and provide route guidance to the user to a particular destination. Route guidance may include step by step instructions (i.e. turn-by-turn) to perform between locations. System 101 is also configured to optionally provide description data to device 105 to inform user 103 about his/her surroundings including particular points of interest, notices, and so forth.

Terminal 110 is configured to transmit data to device 105. This may be made via known wired and/or wireless methods, including over internet 109 or through direct beaming between terminal 110 and device 105. Terminal 110 may transmit layout data 117 or both layout data 117 and description data 119. Layout data 117 is data related to the physical characteristics of the area, such as planters, benches, areas of construction and so forth. This data is passed to device 105 and process to provide route guidance to user 103.

Description data 119 is data related to the details about the surrounding environment. Description data 119 is used to provide greater context and information about user's 103 surroundings. Description data 119 is communicated to device 105 and processed to generate description information 121 to user 103. Description information relates to particular characteristics and details about a specific location or may be general in nature. This can be thought of as information that may typically be observable to a user with reasonable vision. Examples of description information 121 include particular points of interest, such as exits, help desks, and emergency services. As seen with this example, some layout features of layout data 117 can also be used communicated as description information 121. Additionally, description information 121 can be more detailed in that it may convey more details. For example, device 105 may communicate to user 103 where a door is located (point of interest) and may also communicate that an alarm will sound if opened (secondary information). In the context of a business, the description information may relay the type of business, hours of operation, and a short description. Warnings, notices, advertisements, and services are also examples of types of information that may be communicated through description data 119.

Figure 3:
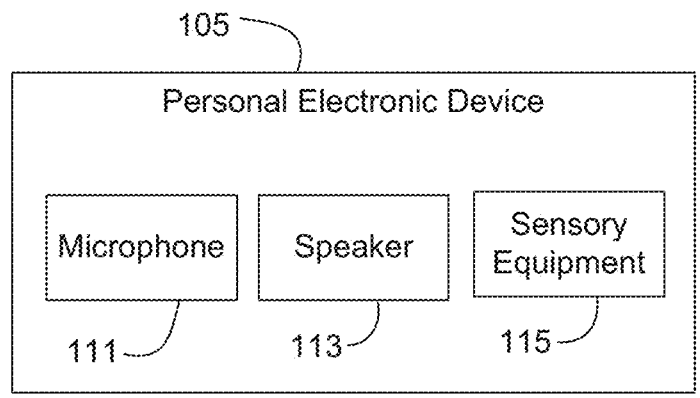
FIG. 3 is a chart of communication methods for a portable electronic device used in the navigation system of FIG. 1.

Referring now also to FIG. 3 in the drawings, a chart of communication methods for device 105 is illustrated. Information has to be relayed to user 103. As a visually impaired individual, user 103 will tend to receive communication from device 105 using audible or sensory methods. Device 105 may therefore include a speaker 111 to emit sound to user 103. A microphone 113 may also be included to permit user 103 to provide information and command data to device 105. Additionally a sensory pad 115 may be used where information is conveyed to user 103 through the sense of touch. Information from layout data and description data may be provided to the user automatically or upon request by user 103. Device 105 is configured to accept user preferences and a plurality of settings to permit the user to customize the level of detail/information automatically provided.

Figure 4:
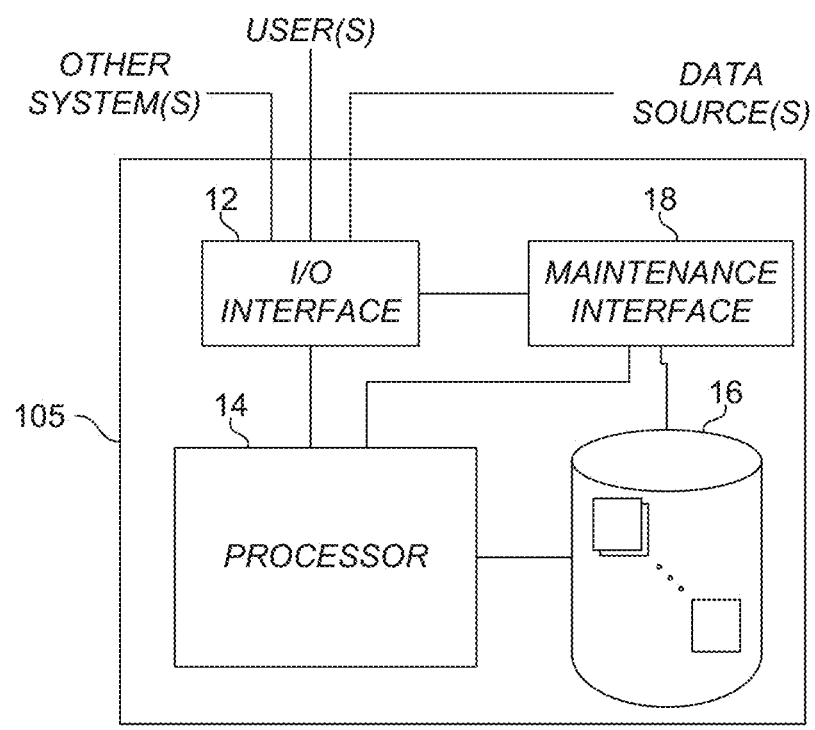
FIG. 4 is an exemplary chart illustrating the portable electronic device of FIG. 3.

Referring now in particular to FIG. 4 in the drawings, device 105 is described in more detail. FIG. 4 illustrates an exemplary schematic of device 105. FIG. 4 is an exemplary configuration and design for device 105 used to identify user's 103 current location and transmit command data to user 103 to instruct user 103 how to navigate between two or more locations. As stated previously, the illustrated configuration permits for wireless and wired communications as well as internet/web communications. It is understood that terminal 110 may also be represented by the features and elements herein described in FIG. 4. Terminal 110 may also have one or more processors, input/output interfaces, and storage methods.

The device 105 includes an input/output (I/O) interface 12, a processor 14, a database 16, and a maintenance interface 18. Alternative embodiments can combine or distribute the input/output (I/O) interface 12, optimization engine 14, database 16, and maintenance interface 18 as desired. Embodiments of device 105 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example smart phones, electronic tablets, personal data assistants, and computer workstations, that are suitable for also performing other tasks. Furthermore the computers and machines may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of device 105. The I/O interface 12 can be configured for allowing one or more users to input information to device 105 via any known input device, such as a display or via voice command. Examples can include a keyboard, mouse, touch screen, microphone, and/or any other desired input device. The I/O interface 12 can be configured for allowing one or more users to receive information output from device 105 via any known output device. Examples can include speaker 113 and sensory equipment 115, and/or any other desired output device. The I/O interface 12 can be configured for allowing other systems to communicate with device 105. For example, the I/O interface 12 can allow one or more remote computers to access information, input information, and/or remotely instruct device 105 to perform one or more of the tasks described herein. The I/O interface 12 can be configured for allowing communication with one or more remote data sources.

The database 16 provides persistent data storage for device 105. While the term "database" is primarily used, a memory or other suitable data storage arrangement may provide the functionality of the database 16. In alternative embodiments, the database 16 can be integral to or separate from device 105 and can operate on one or more computers or computerized electronic devices. The database 16 preferably provides non-volatile data storage for any information suitable to support the operation of device 105. Database 16 stores data used in the generation of route guidance and communication of description information 121. Examples may include, turn by turn instructions, distances, attributes and descriptions of objects, maps, building plans, and so forth.

The maintenance interface 18 is configured to allow users to maintain desired operation of device 105. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of processor 14 and/or the I/O interface 12. This can include, for example, software updates and/or administrative tasks such as security management and/or adjustment of certain tolerance settings.

The processor 14 is configured to determine the location of the user and transmit route guidance and description information 121 to user 103. Processor 14 also receives signal data from transmitters 107 to ascertain the current location of user 103 in preparation of formulating route instructions. Processor 14 may access and compare information stored on database 16 for producing such information and guidance. Processor 14 can include various combinations of one or more processors, memories, and software components.

Figure 5:
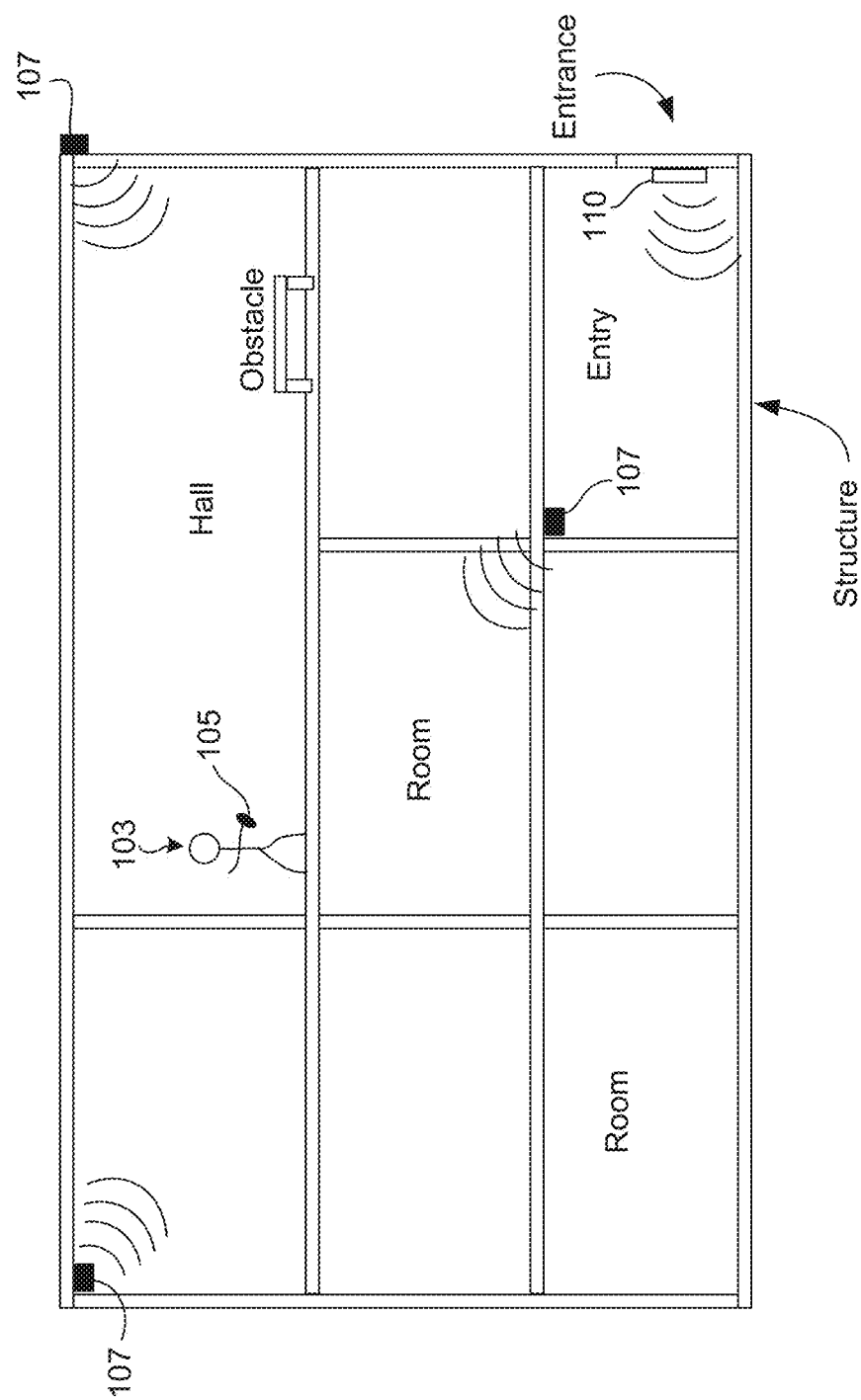
FIG. 5 is an exemplary layout of a building utilizing the navigation system of FIG. 1.

Referring now also to FIG. 5 in the drawings, an exemplary layout of a building utilizing system 101 is illustrated. Route guidance is provided based on the particular location of user 103. Device 105 is configured to calculate the location of user 103 within the area by communicating with transmitters 107. Transmitters 107 are selectively positioned throughout the area and are configured to broadcast a signal 123 at some predefined interval. Device 105 receives and processes signals 123 to generate route guidance. Transmitters 107 are powered by a remote source, remote to that of device 105 (i.e. battery, power grid). Signals 123 may be broadcast continuously and selectively detected by device 105. Other embodiments of transmitters 107 may broadcast signal 123 intermittently, as a pulse for example. The precise location of user 103 is performed by receiving signal 123 from a plurality of transmitters 107 and processing characteristics of the signals 123 to determine a particular coordinate for user 103. Device 105 may use signal strength as a measure of distance from each transmitter 107.

As seen in FIG. 5, location transmitters 107 may be located in remote and rather distant locations throughout a structure or area (inside/outside, different floors, . . . ). As transmitters 107 are under their own power (i.e. not powered by device 105), their particular location is independent of proximity to device 105. Additionally, transmitters 107 are configured to have varied signal strength that allows an operator to select the strength and reach of signal 123. This may be an adjustable feature of transmitters 107 or different types of transmitters 107 may be selected according to the necessary signal strength. An advantage of system 101 is the use of transmitters 107 that are under their own power and can produce far reaching signals. This allows the owner of an area or structure to be able to equip the structure with a fewer number of transmitters 107. Cost to develop greatly decreases compared to systems where the proximity of device 105 is necessary to power and receive information from sensors/transmitters.

System 101 operates by being able to calculate a position of the user 103 (via signals 123) and understand the physical surroundings (via layout data 117) sufficiently so as to produce a route to travel based upon the position of the user 103. Layout data 117 and description data 119 are communicated to device 105 upon entrance into the area through terminal 110. In operation, any necessary or requested information about the area may be broadcast to the user upon entry. The user may then elect to select a destination by communicating with device 105. User 103 may select a destination according to its physical location or may use categorical designations. For example, user 103 may state a particular Suite #. Additionally, user 103 may request to go to a particular type of establishment. This is useful where there are limited types of destinations fitting the categorical description. Where multiple options are available, device 105 communicates the options with user 103 and seeks clarification. In some situations device 105 may automatically select the destination according to its proximity to the user. For example, user 103 may request the restroom. Upon such a request, device 105 calculates the nearest restrooms in operation for the gender of user 103. Furthermore, if a single destination (i.e. store) has multiple entrances, device 105 may select the nearest one.

Description information 121 may be provided to user 103 during the course of navigating the area. By monitoring the location of user 103, device 105 is configured to detect user's 103 proximity to particular areas and destinations. Upon reaching a floor or passing a destination, description information may be transmitted to user 103 upon request or automatically. System 101 is designed to grant visually impaired individuals more freedom and knowledge about their surroundings, so that they may more confidently engage and interact in society.

The current application has many advantages over the prior art including at least the following: (1) route guidance within a structure or area outside the purview of satellite images; (2) description information about the surroundings; (3) remote handheld personal electronic device to provide audible or sensory communication; and (4) minimal overhead investment on the part of the visually impaired and businesses.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A navigation system for providing route guidance within a structure, comprising:
   a terminal located near an entrance of an area to be traversed, the terminal configured to store and transmit layout data of the area to be traversed;
   a plurality of location transmitters selectively positioned remotely throughout the area to be traversed, each location transmitter being powered and configured to broadcast a signal; and
   a portable electronic device configured to calculate position and provide route guidance within the area, the portable electronic device configured to receive the signal from the plurality of location transmitters and receive the layout data from the terminal upon entrance of the area;
   wherein a user is able to select a destination with the portable electronic device, the portable electronic device configured to calculate the position of the user and provide route guidance to the user to navigate the area; and
   wherein the portable electronic device automatically provides description information related to points of interest to the user based upon the location determined through the plurality of location transmitters, the description information relating to a non-proximate point of interest to the user.

2. The navigation system of claim 1, wherein the terminal is configured to store and transmit description data to the portable electronic device, the description data used to convey selected points of interest to the user through the portable electronic device.

3. The navigation system of claim 1, wherein the location of the user is calculated based upon signal strength of the location transmitter.

4. The navigation system of claim 1, wherein the location transmitter continually broadcasts the signal.

5. The navigation system of claim 1, wherein the location transmitter intermittently transmits a signal.

6. The navigation system of claim 1, wherein the description information is provided automatically to the user based upon the route and proximity of the user to the point of interest.

7. The navigation system of claim 1, wherein the description information is provided upon request by a user.

8. The navigation system of claim 1, wherein the portable electronic device is configured to receive voice commands from a user to select a particular location.

9. The navigation system of claim 1, wherein the portable electronic device is configured to process the layout data and select from a plurality of destinations and routes a single route and single destination.

10. The navigation system of claim 1, wherein the device sorts and presents destinations to the user for selection by at least one of an address and a categorical designation.

11. The navigation system of claim 1, wherein the user may select the destination by entering an address within the area.

12. The navigation system of claim 1, wherein the user may select the destination by selecting a categorical designation.

13. The navigation system of claim 1, further comprising:
    a sensor configured to transmit description information to the device when the user is within a defined proximity to the sensor.

* * * * *